United States Patent [19]

Hesslein et al.

[11] 3,733,081
[45] May 15, 1973

[54] REMNANT RETRACTOR COLLET

[76] Inventors: Robert J. Hesslein, 3 Bishop Drive, Fayetteville; Robert W. Chamberlin, R.D. 1, Woodworth Road, Central Square, both of N.Y.

[22] Filed: Mar. 23, 1971

[21] Appl. No.: 127,151

[52] U.S. Cl. ................................................279/46
[51] Int. Cl. ............................................B23b 31/00
[58] Field of Search..................279/41, 46, 23, 102; 287/126

[56] References Cited

UNITED STATES PATENTS

| 2,343,570 | 3/1944 | Nelson | 279/46 X |
| 2,778,650 | 1/1957 | Benjamin et al | 279/46 |
| 2,521,099 | 9/1950 | Sheffer | 279/46 |

*Primary Examiner*—Gil Weidenfeld
*Attorney*—Cumpton, Shaw & Stephens

[57] ABSTRACT

An improved retractor collet fastens to a pusher rod in a bar machine and retracts the remnant end of a consumed bar. The collet includes a fixed sleeve with an axial bore and an open end for receiving the bar, and a rotatable gripper is housed within the sleeve ahead of a thrust bearing. The gripper is sized to receive and grip the bar and is freely rotatable within the sleeve as the bar is machined. The gripper holds the remnant end of the bar when the collet is retracted to remove the remnant from the machine.

9 Claims, 3 Drawing Figures

PATENTED MAY 15 1973 3,733,081
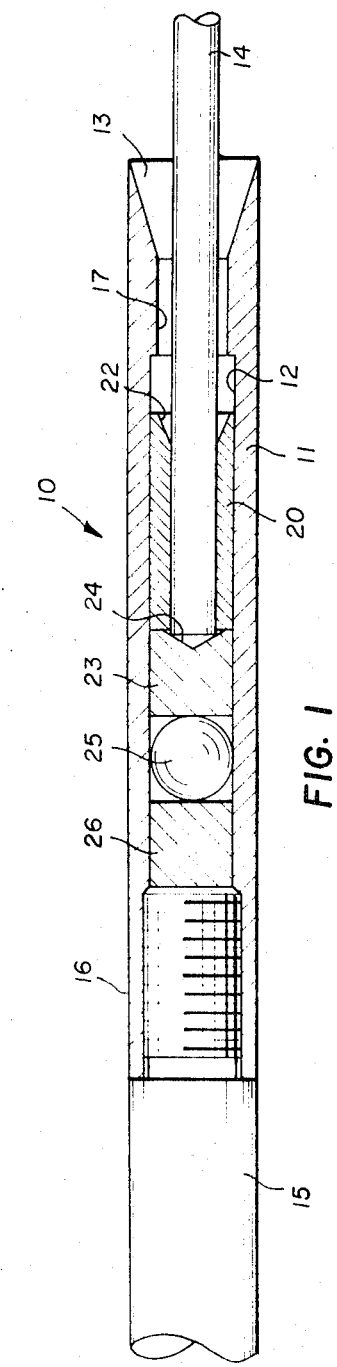
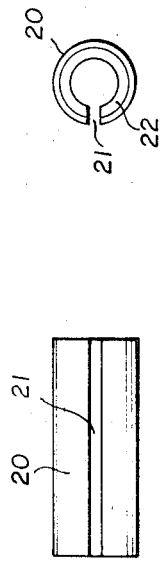
INVENTOR.
ROBERT J. HESSLEIN
ROBERT W. CHAMBERLIN
BY Cumpston, Shaw
and Stephens
ATTORNEYS ated
REMNANT RETRACTOR COLLET

THE INVENTIVE IMPROVEMENT

Retractor collets for bar machines are generally well known. They have resembled conventional collets except that they were rotatably mounted on the end of a pusher rod advancing the bar through the machine. Their function is to grip the trailing end of a bar without interfering with the bar's rotation in the machine, drive the bar along as the pusher rod is advanced, and grip the remnant end of the bar to retract it from the machine as the pusher rod is retracted when the bar is consumed.

The invention involves recognition of a way to simplify retractor collets to reduce their expense and make their use more efficient. The invention also aims at a less expensive inventory of different sizes of retractor collets and easy changeover from one size to another.

SUMMARY OF THE INVENTION

These improvements are achieved by forming a bar gripper as a rotatable element within the axial bore of a sleeve having an end opening for receiving the bar. The gripper is prevented from moving through the end opening and is sized to receive and grip the bar. A rotatable thrust bearing is in the sleeve bore behind the gripper so the gripper can rotate freely with the bar. The gripper is preferably a split tube so that an inventory of interchangeable gripper tubes with different sized inside diameters is relatively inexpensive.

DRAWINGS

FIG. 1 is a longitudinal, axial, cross-sectional view of a preferred embodiment of the inventive remnant retractor collet;

FIG. 2 is plan view of a gripper tube for use in the inventive collet; and

FIG. 3 is an end elevation of the gripper tube of FIG. 2.

DETAILED DESCRIPTION

Remnant retractor collet 10 includes a sleeve 11 having an axial bore 12 and an open end 13 for receiving a bar 14 for feeding to a bar working machine such as an automatic screw machine or lathe. A coupler 15 is threaded into the closed end 16 of sleeve 11, and coupler 15 attaches sleeve 11 to a pusher rod (not shown) for advancing bar 14.

A gripper 20, preferably formed as a split tube, fits loosely in bore 12 for free rotation inside sleeve 11. Bore 12 has a region of reduced inside diameter to form an internal collar 17 near open end 13, and the outside diameter of gripper tube 20 is larger than the inside diameter of collar 17 so that gripper tube 20 cannot escape out open end 13. Gripper tube 20 is preferably formed of hardened and ground spring steel with a longitudinal slit 21 and a beveled end 22. The inside diameter of tube 20 is sized to receive and grip bar 14 firmly enough for retracting the remnant end of bar 14. Rather than having a slit 21, gripper tube 20 can be deformed in several possible ways to provide a spring grip on bar 14. Gripper 20 can also be a socket-shaped element fitting within bore 12 and open only at one end for gripping bar 14. Gripper 20 is preferably free to move axially a small distance within bore 12 as well as rotate freely within bore 12.

A live bar stop 23 is rotatably housed in bore 12 behind gripper tube 20, and the bar-confronting end of stop 23 preferably has a conical surface 24 for engaging the trailing end of bar 14. Bar 14 can then pass all the way through gripper tube 20 and engage the conic surface 24 of live stop 23.

A ball bearing 25 is arranged behind live stop 23 and ahead of ball seat 26 so as to afford nearly point contact between seat 26 and stop 23. Ball 25 and ball seat 26 are preferably rotatable within bore 12, and also free to move axially if necessary. Stop 23, ball 25, and seat 26 form a thrust bearing arranged behind gripper tube 20 and are designed to accommodate the wear and thrust from turning and pushing forces on bar 14.

A plurality of gripper tubes 20 are preferably available for use inside a sleeve 12 to accommodate different diameters of bars 14. Each size of gripper tube 20 preferably has a different inside diameter and the same outside diameter sized to fit loosely in bore 12. This means that only gripper tubes 20 need be changed for different sizes of bars 14, and since gripper tubes 20 are the only parts of collet 10 that need be formed of hardened, spring steel, an inventory of different sized gripper tubes 20 is much less expensive than a corresponding inventory of previous retractor collets.

In operation, as collet 10 is pushed against the trailing end of a new bar 14, it drives bar 14 against a work stop or a closed collet of the machine with sufficient force so that bar 14 is pushed into collet 10, into gripper tube 20, and eventually against live stop 23. Gripper 20 and live stop 23 rotate with bar 14 inside of sleeve 11 as bar 14 is machined. The remnant end of bar 14 is held by gripper 20 for retraction from the machine when bar 14 is consumed, and a known mechanism withdraws the remnant from gripper 20 near the end of the retraction stroke. Then a new bar 14 is placed in the machine and the process is repeated.

Collet 10 improves over prior art retractor collets in forming the gripper element as a relatively small, simple, and interchangeable part with a fixed, permanent sleeve that also houses a simple and durable thrust bearing. Collet 10 is reliable and effective in operation, simpler and more economical to make, and less expensive in accommodating different sized bars.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the use and adaptation of the inventive collet to a variety of machines and bar feeding and retracting operations.

I claim:

1. A remnant retractor collet comprising:
    a. a sleeve having an axial bore with a forward end opening for receiving the trailing end of a bar;
    b. means for coupling the rear end of said sleeve to a pusher rod for advancing said bar so said bar is rotatable relative to said sleeve;
    c. a resilient gripper having an outside diameter sized for free rotation within said bore of said sleeve;
    d. an internal collar in the region of said forward end of said sleeve for preventing forward movement of said gripper through said end opening of said sleeve;

e. said gripper having an inside diameter sized to receive and grip said trailing end of said bar; and f. rotatable thrust bearing means arranged in said bore of said sleeve behind said gripper and ahead of said coupling means to accommodate the axial force exerted by said sleeve against the relatively rotating trailing end of said bar.

2. The collet of claim 1 wherein said gripper is a split tube open at each end.

3. The collet of claim 1 including a plurality of said grippers having different inside diameters and approximately equal outside diameters to fit different sized bars.

4. The collet of claim 3 wherein said grippers are split tubes open at each end.

5. The collet of claim 1 wherein said thrust bearing means includes a rotatable ball bearing.

6. The collet of claim 5 wherein said gripper is a split tube open at each end.

7. The collet of claim 6 including a rotatable bar stop element arranged between said gripper and said ball bearing.

8. The collet of claim 7 including a movable ball seat arranged on the opposite side of said ball bearing from said bar stop.

9. The collet of claim 8 including a plurality of said grippers having different, inside diameters and approximately equal outside diameters to fit different sized bars.

* * * * *